United States Patent [19]

Delli-Gatti, Jr.

[11] E Re. 28,741

[45] Reissued Mar. 23, 1976

[54] MINING MACHINE GATHERER WITH FENCE AND ARCUATE DISC VANES

[75] Inventor: Frank A. Delli-Gatti, Jr., Amity, Pa.

[73] Assignee: Lee-Norse Company, Charleroi, Pa.

[22] Filed: Oct. 30, 1974

[21] Appl. No.: 519,266

Related U.S. Patent Documents

Reissue of:

[64] Patent No.: 3,817,579
Issued: June 18, 1974
Appl. No.: 243,973
Filed: Apr. 14, 1972

[52] U.S. Cl. ..... 299/68; 198/9
[51] Int. Cl.[2] ..... B65G 65/06; E21C 35/02
[58] Field of Search ..... 198/9; 37/190; 299/68, 299/67, 64

[56] References Cited

UNITED STATES PATENTS

| | | | |
|---|---|---|---|
| 1,256,642 | 2/1918 | Barber | 198/9 |
| 1,528,474 | 3/1925 | French | 198/9 X |
| 2,696,288 | 12/1954 | Ball | 198/9 |
| 3,390,755 | 7/1968 | Stacy | 198/9 |
| 3,417,851 | 12/1968 | Gonski et al. | 198/9 |

FOREIGN PATENTS OR APPLICATIONS

| | | | |
|---|---|---|---|
| 117,035 | 5/1958 | U.S.S.R. | 198/9 |

*Primary Examiner*—Ernest R. Purser
*Attorney, Agent, or Firm*—Bernard J. Murphy

[57] ABSTRACT

A continuous mining machine particularly adapted for low overhead coal seams having a relatively small diameter cutterhead of the non-oscillating or fixed head type driven by chains that also cut coal and convey it rearwardly to a gathering head mounted on the front of the machine. The gathering head carries a pair of counter-rotating discs having vanes cooperating with conveyor fences for sweeping and discharging coal to a conventional conveyor mounted on the machine chassis.

13 Claims, 6 Drawing Figures

MINING MACHINE GATHERER WITH FENCE AND ARCUATE DISC VANES

Matter enclosed in heavy brackets [ ] appears in the original patent but forms no part of this reissue specification; matter printed in italics indicates the additions made by reissue.

BACKGROUND OF INVENTION

This invention relates generally to the arts of mining and conveying materials and more specifically to continuous mining machines and improvements therein for mining coal and the like.

It is well known to provide continuous mining machines with a single cutter head rotating on a horizontal axis having a length greater than the width of the mining machine. The cutter head moves vertically up and down the face of a mine to mine coal, normally beginning at the top of the face and moving progressively down to the bottom and then returning to the top of the face where the machine moves forward to sump the head into the face to begin another downward sweep. Generally speaking, the trade calls this type of machine a "fixed head" miner.

Heretofore, fixed head miners have generally used high pressure hydraulic systems for moving the extendible ends of the cutter head inward and outward. Such use of hydraulic fluids under relatively high pressures seems to cause leakage problems that are difficult and expensive to solve. In addition, fixed head miners generally have their cutter heads connected to a driving transmission including gears and shafts extending directly to the cutter head. This type of transmission is expensive, makes the cutter head more bulky, and requires it to be of a relatively large diameter. Thus it is difficult to use this type of transmission arrangement in a mining machine having a cutter head with a relatively small diameter.

It is known to provide gathering heads for conveyors, such as used in continuous mining machines, with counter-rotating tables or discs mounted on the deck or apron of the gathering head and to provide each rotating disc with upstanding radially extending vanes to sweep material onto a conveyor located between the counter-rotating discs. However, it has been found that arranging the vanes to extend radially reduces the ability of the vanes to efficiently sweep conveyed material onto the conveyor.

SUMMARY OF THE INVENTION

The principal object of this invention is to provide new and improved conveying apparatus particularly adapted for mining machines.

Other objects of the invention are to provide conveyor apparatus particularly adapted for mining machines coal seams of thirty inches and less in height; to provide an improved gathering head using counter-rotating tables or discs for sweeping material to a central conveyor; and to provide improvements in the arrangement of the vanes on the counter-rotating disc of a conveyor gathering head.

In accordance with the present invention, a mining machine may be provided with a gathering head located beneath the boom having a pair of counter-rotating discs carrying upstanding vanes for cooperating with a fence overlying each disc to sweep coal into a centrally located conveyor, each vane curving outwardly from adjacent the axis of its disc and rearwardly relative to the direction of rotation of the disc so that each portion of the vane extends at approximately a right angle to the fence as it passes beneath the fence.

BRIEF DESCRIPTION OF DRAWINGS

The invention is described in connection with the accompanying drawings wherein.

DESCRIPTION OF PREFERRED EMBODIMENT

Figure 1:
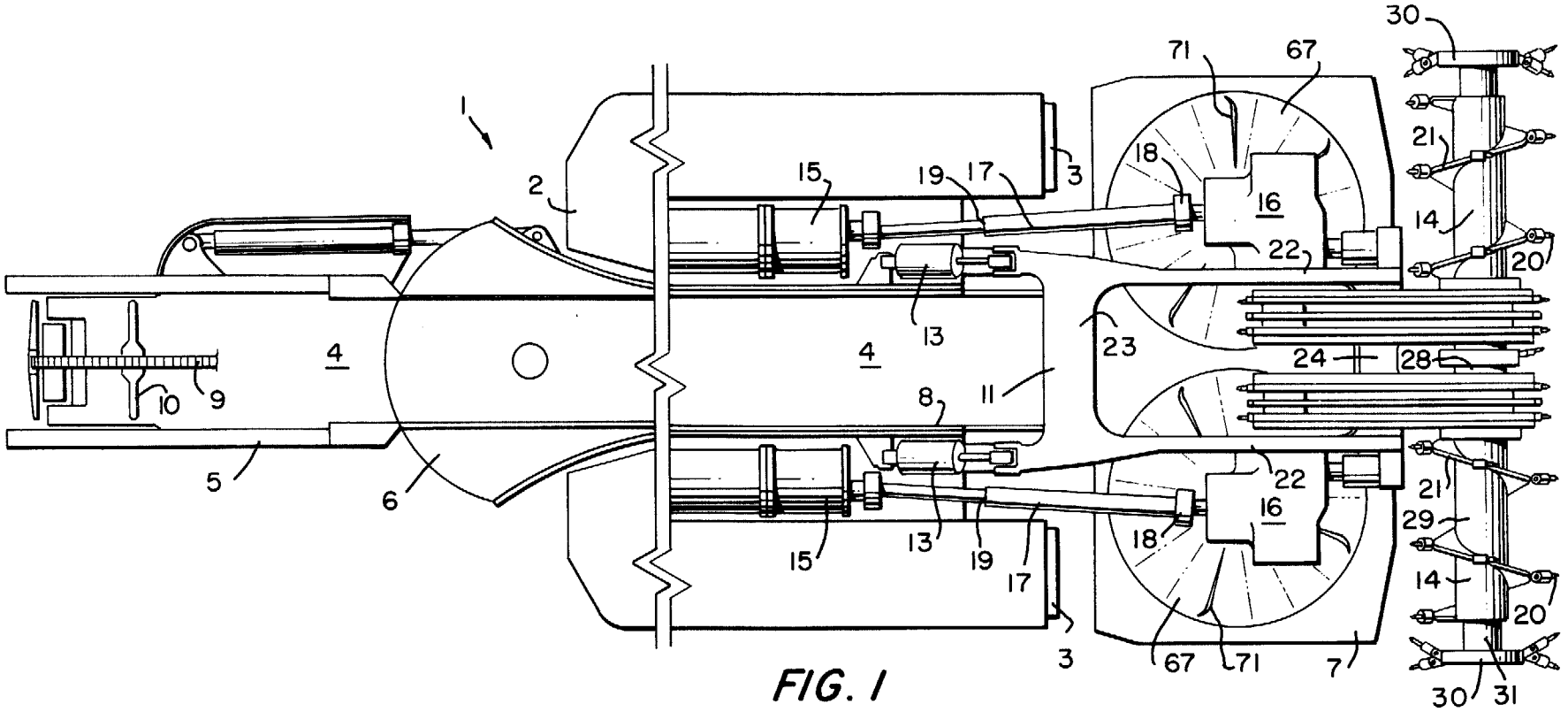
FIG. 1 is a plan view of a mining machine embodying the invention.
Figure 2:
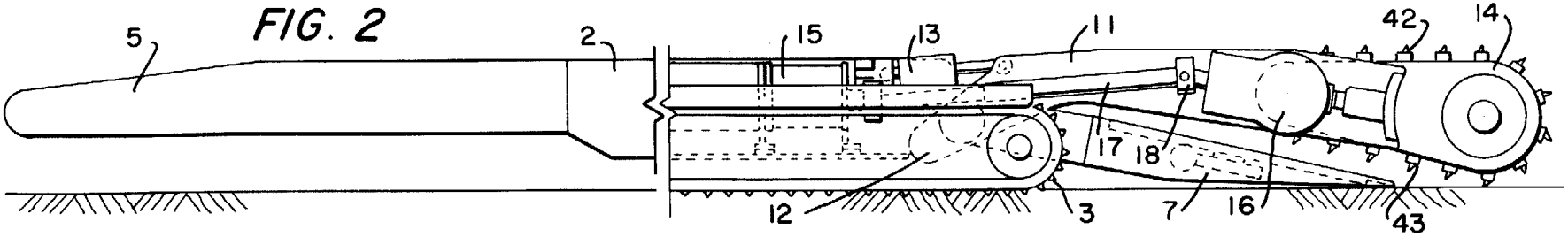
FIG. 2 is a side elevational view of FIG. 1.

Looking at FIGS. 1 and 2, the mining machine 1 conventionally comprises a chassis 2 supported on a pair of crawler tracks 3 and carrying a conveyor 4 running from the front of the chassis 2 to beyond the rear on a tail-piece 5 having an articulated joint 6. A gathering head 7 is pivoted on the front of the chassis 2 and extends forwardly therefrom for conveying coal to the forward end of the conveyor 4. The conveyor 4 includes a trough having the usual side flanges 8 and a chain 9 with cross bars 10 for carrying material along the conveyor trough. A boom 11 is pivotally mounted on the front end of the chassis 2 at 12, to extend upwardly and forwardly therefrom and is raised up and down by a pair of hydraulic cylinders 13 mounted between the chassis 2 and an intermediate portion of the boom 11. A cutter head 14 is rotatively mounted on the forward end of the boom 11. Motors 15 are mounted on the sides of the chassis 2 and are connected to transmissions 16 mounted on the outer sides of the boom 11 by shafts 17 having a universal joint 18 at each end and splined telescopic joints 19 between the ends. The cutter head 14 has the usual cutting bits 20 mounted on the ends of auger-shaped, helically extending flanges 21 arranged to urge coal broken away from a face by the bits 20 to move toward the center of the cutter head 14. It is believed that all of the foregoing structure is conventional in continuous mining machines.

Figures 3, 4:
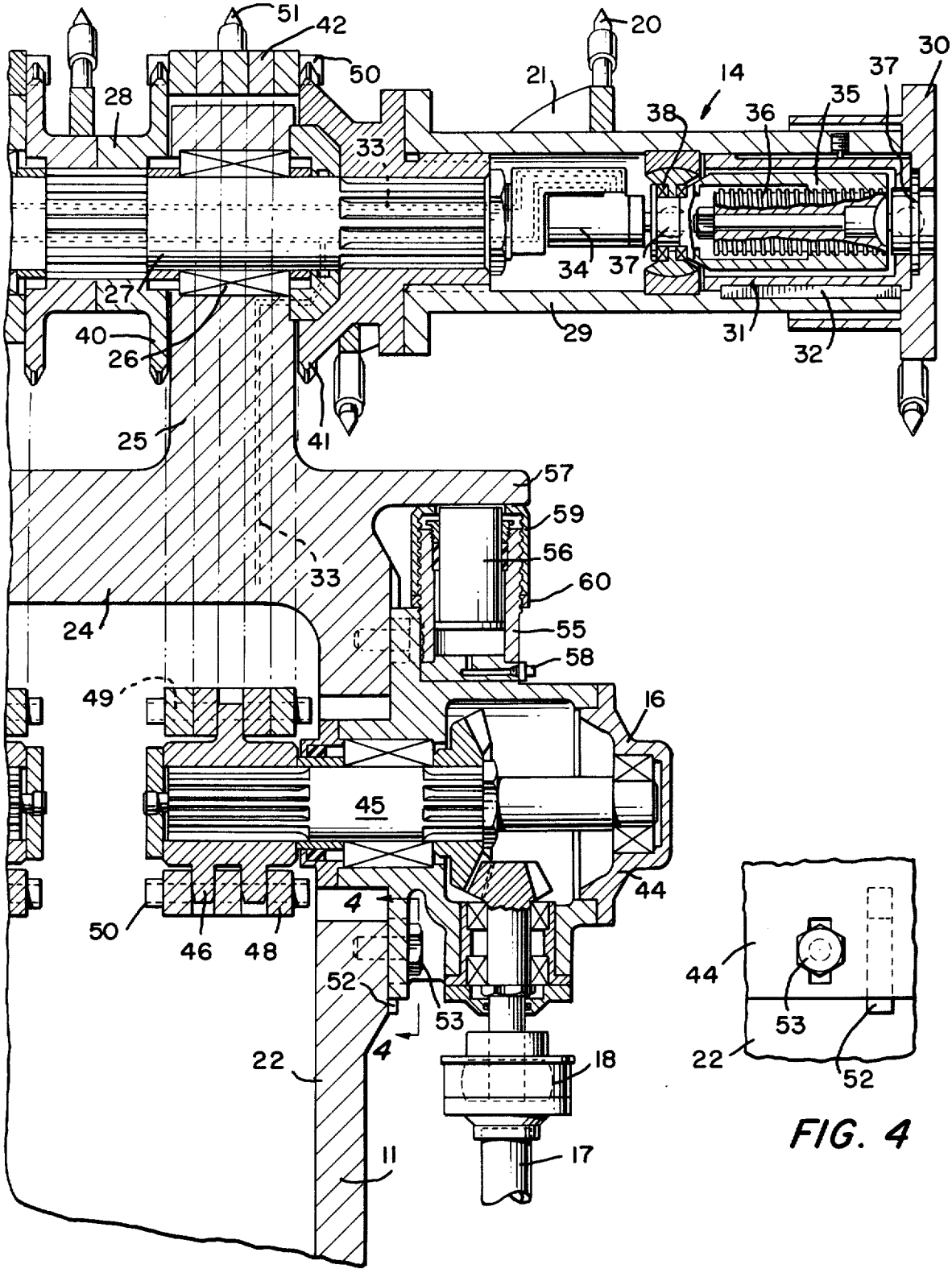
FIG. 3 is a fragmentary axial section of the front portion of the miner showing a part of the cutter head and the details of the driving means for the cutter head.
FIG. 4 is a fragmentary section taken on line 4—4 in FIG. 3.

Looking at FIGS. 1 and 3, the boom 11 is composed of a pair of horizontally spaced longitudinal side members 22 interconnected by a pair of longitudinally spaced cross members to form an openwork construction seen when looking down on the boom 11. The cross members include a rear cross member 23 located intermediate the ends of the side members 22 and a front cross member 24. A pair of integral, horizontally spaced arms 25 extend forwardly from the front cross member 24 and contain bearings 26, shown in FIG. 3, supporting the shaft 27 of the cutter head 14. The cutter head 14 comprises a central drum 28, a pair of outer drums 29 and a pair of extendible end portions 30 telescoped within the outer drums 29. The central drum 28 and the outer drums 29 engage splines on the shaft 27 as shown in FIG. 3 to rotate together in unison. Each extendible end portion 30 includes an inner sleeve 31 telescoping in the interior of the outer drums ) and keyed therein by a key 32, thus anchoring the ıd portion 30 to rotate with the outer drum 29 while :ing able to telescope relative thereto.

The means for moving each end portion 30 relative its outer drum 29 includes a hydraulic motor 34 ounted in the outer drum and driven by relatively low ·essure fluid flowing through supply and return pasges 33 extending through the boom arm 25 and the ıaft 27. The motor 34 drives a long nut 35 threaded on cooperating screw 36 fixed to the end portion 30. ɔth the nut 35 and the screw 36 are connected to their spective members by a universal joint 37 that allows e nut and screw to seek their own alignment with ıch other. The inner end of the nut 35 rotates in bearıgs 38.

It has been found that the use of the relatively low ·essure hydraulic fluid motor 34 in conjunction with ıe screw 36 and cooperating nut 35 is capable of apying relatively large forces to move the end portion ) inwardly and outwardly relative to the outer drum ), thus eliminating the need for pistons and cylinders :quiring relatively high fluid pressures to create the :cessary forces required for telescoping the end porɔn 30. The use of the screw 36 and nut 35 provides a :lf-locking system since the screw is designed so that it ınnot be caused to travel in the nut 35 by thrust forces :ting on the end portion 30.

The central drum 28 includes a sprocket 40 at each ıd, and the inner end of each outer drum 29 carries a ɔrocket 41. Thus the sprockets 40 and 41 are located n the opposite sides or faces of the arms 25, as shown ı FIG. 3. The sprockets 40 and 41 are driven by wide ıultiple-strand chains 42 from the transmissions 16 ıounted on the sides 22 of the boom 11. Each transıission 16 includes a case 44 containing an output ıaft 45 driving a sprocket 46 engaging a chain 42.

The multiple-strand chain 42 is formed of a series of nks 48 pivoted together by pins 49 having heads 50 rojecting beyond the sides of the chain. The chain 42 ıown in FIG. 3 contains five strands, thus being relavely wide. The chain 42 extends around the sprockets 0 and 41 in the cutter head, and the heads 50 of the ins 49 engage in the teeth of the sprockets 40 and 41 ɔ drive the cutter head 14. In addition to transmitting ɔrque, the chain 42 carries a series of longitudinally ɔaced cutting bits 51 serving to cut coal as they rotate round the cutter head and to convey coal rearwardly way from the cutter head as they travel rearwardly. It ill be recognized that the chains rotate clockwise, as ıown in FIG. 2, the same direction of rotation as the utter head 14, thus cutting the coal downwardly and :arwardly from the cutter head 14. Due to being riven in a clockwise direction as shown in FIG. 2, the ɔwer run or flight 43 of the chain 42 is tensioned which ıcreases its effectiveness to carry the cut coal rearardly to the gathering head 7. The tension on the ɔwer run 43 makes the bits 51 on the chain 42 stand gidly relative to the chain to make them more effecve in carrying the coal rearwardly than they would be the lower run 43 of the chain was slack.

Novel means is shown for adjusting the transmissions 6 relative to the boom side walls 22 to adjust the :nsion on the chains 42. Each transmission case 44 is ɔngitudinally adjustable on key ways 52 formed in the de wall 22, and is attached to the side wall 22 by bolts 3 extending through slots in the transmission case 44 nd threaded into the boom side walls 22. The forward nd of the transmission case 44 includes a cylinder 55 containing a piston 56 projecting forward to engage an outwardly extending wing 57 on the boom 11. Thus the cylinder 55 is located between the transmission 16 and the outwardly extending wing 57 of the boom 11. The cylinder 55 contains a grease fitting 58 connected to a passage for feeding grease under pressure into the cylinder to urge the piston 56 forwardly against the boom wing 57, and thus to force the transmission case 44 rearwardly to increase the tension on the cutter chain 42.

When the proper chain tension is achieved, the sleeve nut 59 threaded on the forward portion of the cylinder 55 is screwed outwardly until engaged solidly against the boom wing 57 and a lock nut 60 is moved to lock the sleeve nut 59 in adjusted position. It will be noted that this arrangement provides a simple means for adjusting the transmission case 44. Once the chain tension is properly adjusted, the bolts 53 are tightened to lock the transmission case 44 in place solidly on the boom side wall 22.

Figure 5:
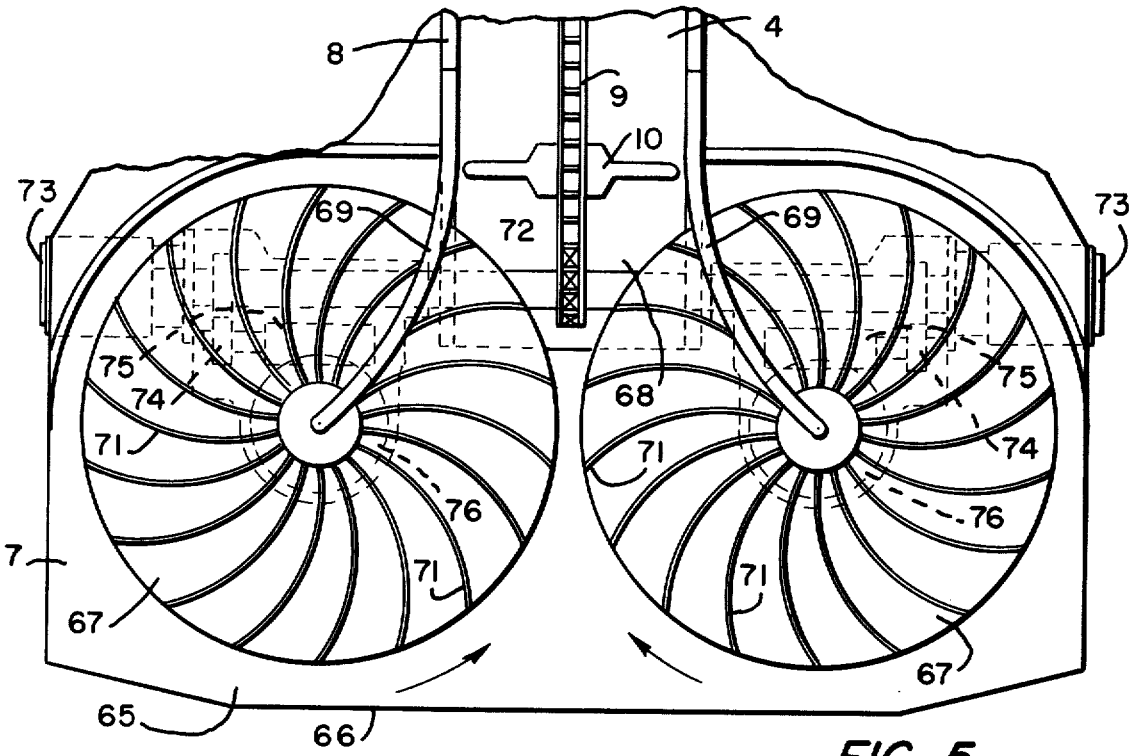
FIG. 5 is a fragmentary plan view of the gathering head.

The gathering head 7 is shown in FIG. 5 and includes a large apron or deck 65 having a forward end 66 and is pivoted at its rear end to the chassis 2 of the miner 1 in a conventional manner. A pair of counter-rotating discs 67 are mounted in the gathering head deck 65 and rotate in the direction of the arrows to move conveyed material centrally and rearwardly to the forward end 68 of the conveyor 4. The conveyor 4 includes the parallel side flanges 8 which extend forwardly into a pair of fences 69 flaring outwardly and terminating at or near the axis of each disc 67. The fences 69 are arranged to guide or cam material off of each gathering head disc 67 as they rotate beneath the fences. At the same time, the movement of the disc 67 urges the coal or other conveyed material rearwardly onto the front end of the conveyor 68.

Important features of this arrangement include the provision of upstanding vanes 71 on each disc 67 and extension of the vanes 71 relative to the radius of the disc so the vanes 71 curve outwardly and rearwardly relative to the rotating direction of each disc, whereby, as they approach the periphery of each disc, they extend at a substantial angle relative to the radius and rearwardly relative to the direction of rotation of the disc. This manner of extending each vane 71 is preferred as it serves to aid in guiding the conveyed material off of the disc as each vane 71 passes beneath a fence 69. It can be seen that if the vane 71 extended radially, the material might be caught between the vane 71 and the fence 69 to cause damage to either member. It is preferable to curve each vane 71 relative to the curve of the fence 69 so that each portion of the vane 71 extends generally at a right angle relative to the fence 69 as it passes beneath it.

In an example of a gathering head constructed by the inventor, the surface of the discs 67 lie in the plane of the deck surface and the vanes 71 project above the deck surface about ⅝ inches.

The foregoing type of gathering head is particularly useful in a continuous miner designed for very low seams, i.e., seams of less than 30 inches in height.

The discs 67 are driven by a drive system shown in dotted lines in FIG. 5, including a shaft 72 driven at each end by a motor 73 and driving gears 74 connected to a worm 75 engaging a worm gear 76 fixed to each disc 67. In addition, the shaft 72 simultaneously carries a sprocket driving the conveyor chain 9.

Figure 6:
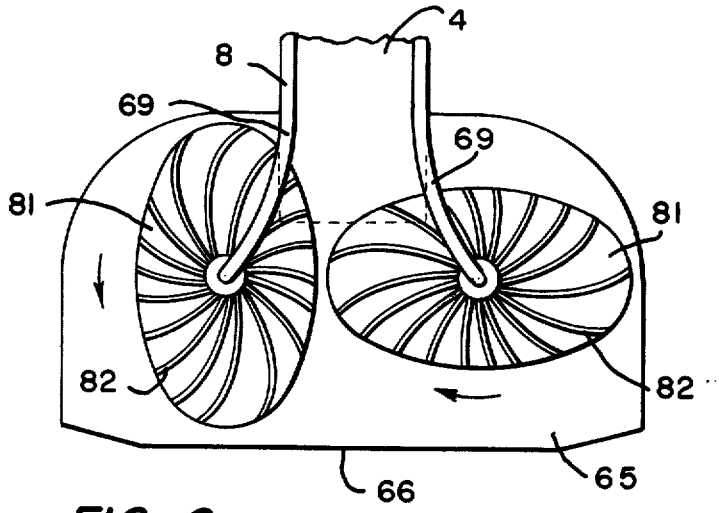
FIG. 6 is a view similar to FIG. 5 on a smaller scale of an alternate embodiment of the gathering head.

Another embodiment of gathering head 80 is shown in FIG. 6 employing oval or elliptical discs 81 arranged to rotate 90° out of phase with each other and carrying vanes 82 similar to the vanes 71. This arrangement will oscillate the central area between the discs 81 back and forth and is believed to benefit the feeding of material onto the conveyor.

While several embodiments of the invention are shown and described in detail, this invention is not limited simply to the specifically described embodiments, but contemplate other embodiments and variations utilizing the concepts and teachings of this invention.

I claim:

[1. Conveying apparatus including:

a chassis mounted conveyor traveling from the front of the chassis rearwardly;

a gathering head including a pair of counter-rotating discs rotatively mounted on said gathering head to sweep material landing on the gathering head centrally and rearwardly of said gathering head to said conveyor;

each of said discs including a plurality of upstanding angularly spaced vanes, each of which extends outwardly from the center of the disc and has at least a portion thereof extending at an angle to the radius of the disc and in a direction counter to the rotary direction of the disc; and a fence extending from adjacent the center of each said disc to a side of said conveyor for cooperating with said vanes to guide material on said discs to said conveyor;

said vanes passing beneath said fences during the rotation of said discs.]

2. [The conveying machine of claim 1 wherein:] *Conveying apparatus including:*

*a chassis mounted conveyor traveling from the front of the chassis rearwardly;*

*a gathering head including a pair of counter-rotating discs rotatively mounted on said gathering head to sweep material landing on the gathering head centrally and rearwardly of said gathering head to said conveyor;*

*each of said discs including a plurality of upstanding angularly spaced vanes, each of which extends outwardly from the center of the disc and has at least a portion thereof extending at an angle to the radius of the disc and in a direction counter to the rotary direction of the disc; and*

*a fence extending from adjacent the center of each said disc to a side of said conveyor for cooperating with said vanes to guide material on said discs to said conveyor;*

*said vanes passing beneath said fences during the rotation of said discs; and wherein* each of said vanes curves outwardly from adjacent the center of the disc and in a direction counter to the rotary direction of the rotation of the disc.

3. [The conveying machine of claim 1 wherein:] *Conveying apparatus including:*

*a chassis mounted conveyor traveling from the front of the chassis rearwardly;*

*a gathering head including a pair of counter-rotating discs rotatively mounted on said gathering head to sweep material landing on the gathering head centrally and rearwardly of said gathering head to said conveyor;*

*each of said discs including a plurality of upstanding angularly spaced vanes, each of which extends outwardly from the center of the disc and has at least a portion thereof extending at an angle to the radius of the disc and in a direction counter to the rotary direction of the disc; and*

*a fence extending from adjacent the center of each said disc to a side of said conveyor for cooperating with said vanes to guide material on said discs to said conveyor;*

*said vanes passing beneath said fences during the rotation of said discs; and wherein* each of said vanes is curved so that each portion of the vane forms approximately a right angle with a said fence as the vane travels progressively beneath the fence.

4. The conveying machine of claim 3 wherein:

said discs are circular in shape.

5. The conveying machine of claim 3 wherein:

said discs are oval in shape.

[6. Conveying apparatus comprising conveyor means, gathering means operatively associated with said conveyor means for supplying material thereto, said gathering means including at least one disc rotatably driven in a predetermined rotary direction and a plurality of vanes on said disc and swept-back in the direction of the rotation of the disc, and fence means extending from adjacent the center of said disc towards said conveyor means cooperative with said vanes for guiding material on said disc to said conveyor means, said vanes passing below said fence means during the rotation of said disc.]

7. [Conveying apparatus according to claim 6,] *Conveying apparatus comprising conveyor means, gathering means operatively associated with said conveyor means for supplying material thereto, said gathering means including at least one disc rotatably driven in a predetermined rotary direction and a plurality of vanes on said disc and swept-back in the direction of the rotation of the disc, and fence means extending from adjacent the center of said disc towards said conveyor means cooperative with said vanes for guiding material on said disc to said conveyor means, said vanes passing below said fence means during the rotation of said disc, and* wherein each said vane is curved whereby each portion of the vane forms approximately a right angle with said fence means as said vane passes progressively beneath said fence means.

[8. In a mining machine, a chassis, boom means carried by said chassis, rotary cutter head means carried by said boom means, conveyor means extending along said chassis, and gathering means operatively associated with said conveyor means for supplying material thereto, said gathering means comprising a plurality of counter-rotating discs and vanes on said discs, said vanes extending outwardly from adjacent the centers of their respective discs towards the peripheries thereof and having outer ends adjacent said peripheries, and said outer end of each vane trailing an inner portion thereof in the rotary direction of the rotation of the respective disc, and fence means extending from adjacent the center of each said disc towards a side of said conveyor means for cooperating with said vanes to guide material on said discs to said conveyor means, said vanes passing beneath said fence means during the rotation of said discs.]

[9. A mining machine according to claim 8, wherein said discs extend outwardly of opposite sides of said conveyor means whereby said conveyor means is centrally of said discs, and said fence means for each said disc extends towards the side of said conveyor means most adjacent to the disc.]

[10. Conveying apparatus comprising conveyor means, gathering means operatively associated with said conveyor means for supplying material thereto, said gathering means comprising a plurality of counter-rotating discs and vanes on said discs, said vanes extending outwardly from adjacent the centers of their respective discs towards the peripheries thereof and having outer ends adjacent said peripheries, and said outer end of each vane trailing an inner portion thereof in the rotary direction of the rotation of the respective disc, and fence means extending from adjacent the center of each said disc towards a side of said conveyor means for cooperating with said vanes to guide material on said discs to said conveyor means, said vanes passing beneath said fence means during the rotation of said discs.]

[11. Conveying apparatus according to claim 10, wherein said vanes angle in the direction opposite to the rotary direction of the rotation of their respective discs as they extend outwardly thereon.]

12. [Conveying apparatus according to claim 10,] *Conveying apparatus comprising conveyor means, gathering means operatively associated with said conveyor means for supplying material thereto, said gathering means comprising a plurality of counter-rotating discs and vanes on said discs, said vanes extending outwardly from adjacent the centers of their respective discs towards the peripheries thereof and having outer ends adjacent said peripheries, and said outer end of each vane trailing an inner portion thereof in the rotary direction of the rotation of the respective disc, and fence means extending from adjacent the center of each said discs towards a side of said conveyor means for cooperating with said vanes to guide material on said discs to said conveyor means, said vanes passing beneath said fence means during the rotation of said discs, and* wherein said vanes arcuately extend in the direction opposite to the rotary direction of their respective discs as they extend outwardly thereon.

13. Conveying apparatus according to claim [10,] *12*, wherein said discs are circular.

14. Conveying apparatus according to claim [10,] *12*, wherein said discs are oval.

*15. A mining machine comprising a chassis, boom means carried by said chassis, rotary cutter head means carried by said boom means, conveyor means extending along said chassis, and gathering means operatively associated with said conveyor means for supplying material thereto, said gathering means comprising a plurality of counter-rotating discs and arcuate vanes on said discs, said discs extending outwardly of opposite sides of said conveyor means whereby said conveyor means is centrally of said discs, said vanes on each said disc extending arcuately outwardly on the disc towards the periphery thereof in the direction opposite to the rotary direction of the rotation of the disc and having outer portions adjacent such periphery trailing inner portions of the vanes in such rotary direction, and fence means extending from centrally of each said disc towards the side of said conveyor means most adjacent to the disc for cooperating with said vanes to guide material on said discs to said conveyor means, said vanes passing beneath said fence means during the rotation of said discs.*

*16. A mining machine according to claim 15, wherein each of said vanes is curved so that each portion of the vane forms approximately a right angle with its said fence means as it passes progressively beneath such fence means.*

*17. A mining machine comprising a chassis, boom means carried by said chassis, rotary cutter head means carried by said boom means, conveyor means extending along said chassis, and gathering means operatively associated with said conveyor means for supplying material thereto, said gathering means comprising a plurality of counter-rotating discs and curved vanes on said discs, said discs extending outwardly of opposite sides of said conveyor means whereby said conveyor means is centrally of said discs, said curved vanes on each said disc extending arcuately outwardly on the disc towards the periphery thereof at an angle to the radius of the disc and in the direction opposite to the rotary direction of the rotation of the disc, and fence means extending from centrally of each said disc over the disc towards the side of said conveyor means most adjacent to the disc for cooperating with said curved vanes to guide material on said discs to said conveyor means, said fence means for each said disc extending at least substantially to the periphery thereof, and said curved vanes passing beneath said fence means during the rotation of said discs.*

*18. A mining machine according to claim 17, wherein each of said vanes is curved so that each portion of the vane forms approximately a right angle with its said fence means as it passes progressively beneath such fence means.*

*19. A mining machine according to claim 17, wherein said discs are oval.*

* * * * *